United States Patent
Sivley, IV et al.

(10) Patent No.: US 6,554,287 B1
(45) Date of Patent: Apr. 29, 2003

(54) COLLAPSING TYPE SEAL FOR EXPANDABLE TUBULAR CONNECTIONS

(75) Inventors: Robert S. Sivley, IV, Kingwood, TX (US); John F. Greenip, Houston, TX (US)

(73) Assignee: Hydril Company, Houston, TX (US)

(*) Notice: Subject to any disclaimer, the term of this patent is extended or adjusted under 35 U.S.C. 154(b) by 0 days.

(21) Appl. No.: 09/457,997

(22) Filed: Dec. 9, 1999

(51) Int. Cl.7 ............................................... F16L 17/00
(52) U.S. Cl. .................... 277/616; 277/602; 277/609; 277/323; 277/336; 285/333; 285/334; 285/355
(58) Field of Search ................................ 277/323, 336, 277/337, 602, 616, 609; 285/333, 334, 355, 390

(56) References Cited

U.S. PATENT DOCUMENTS

| | | | |
|---|---|---|---|
| 2,239,942 A | | 4/1941 | Stone et al. ................. 285/146 |
| 2,258,066 A | * | 10/1941 | Oyen |
| 2,893,759 A | * | 7/1959 | Blose |
| 2,992,019 A | | 7/1961 | MacArthur ................. 285/110 |
| 3,359,013 A | | 12/1967 | Knox et al. .................... 285/13 |
| 3,997,193 A | * | 12/1976 | Tsuda et al. |
| RE30,647 E | | 6/1981 | Blose ....................... 285/332.2 |
| 4,388,752 A | * | 6/1983 | Vinciguerra et al. |
| 4,611,838 A | * | 9/1986 | Heilmann et al. |
| 4,629,221 A | | 12/1986 | Lumsden et al. ............ 285/328 |
| 4,648,627 A | | 3/1987 | Reimert ......................... 285/24 |
| 4,707,001 A | | 11/1987 | Johnson .................... 285/332.3 |
| RE34,467 E | | 12/1993 | Reeves ........................ 285/334 |
| 5,516,158 A | * | 5/1996 | Watts |

FOREIGN PATENT DOCUMENTS

| | | |
|---|---|---|
| DE | 44 46 806 C1 | 12/1994 |
| EP | 0 957 233 A2 | 11/1999 |
| WO | WO-86-03570 * | 6/1986 ................. 285/334 |

OTHER PUBLICATIONS

European Search Report dated Mar. 6, 2001, 3 pages.

* cited by examiner

Primary Examiner—Anthony Knight
Assistant Examiner—E Peavey
(74) Attorney, Agent, or Firm—Rosenthal & Osha, L.L.P.

(57) ABSTRACT

A seal for a radially expansible conduit connection is disclosed. The seal includes a first sealing surface disposed proximal to an end of a male portion of the connection and a corresponding second sealing surface disposed proximal to an end of a female portion of the connection. The first and said second sealing surfaces are substantially opposite each other upon connection of the male and female portions. The seal includes a first clearance surface proximal to the first sealing surface and a second clearance surface proximal to the second sealing surface. The first and second clearance surfaces are substantially opposite each other upon connection of the male and female portions. The first and second clearance surfaces, and the first and second sealing surfaces each have a diameter such that upon radial expansion of the male portion and the female portion after coupling together thereof, the clearance surfaces remain out of contact while the sealing a surfaces contact each other so as to develop a contact pressure. In one embodiment, the clearance between the sealing surfaces prior to expansion is about 30 to 40 percent of the amount of expansion. In another embodiment, the sealing surfaces are in interference contact prior to expansion. In one embodiment, the clearance surfaces have a clearance, prior expansion, of about 50 to 55 percent of the amount of expansion. In a particular embodiment, the conduit connection is a threaded coupling.

19 Claims, 2 Drawing Sheets

COLLAPSING TYPE SEAL FOR EXPANDABLE TUBULAR CONNECTIONS

BACKGROUND OF THE INVENTION

1. Field of the Invention

The invention is related to threaded tubular joints usable in oil and gas well drilling and production, such as tubing, casing, line pipe, and drill pipe, commonly known collectively as oilfield tubular goods. More particularly, the invention relates to a seal for tubular joints for connecting male (pin) and female (box) members.

2. Description of the Related Art

Threaded tubular connections are used for joining segments of conduits end-to-end to form a continuous conduit for transporting fluid under pressure. Oilfield tubular goods generally use such threaded connections for connecting adjacent sections of conduit or pipe. Examples of such threaded end connections designed for use on oilfield tubular goods are disclosed in U.S. Pat. Nos. 2,239,942; 2,992,019; 3,359,013; RE 30,647; and RE 34,467, all of which are assigned to the assignee of this invention.

In U.S. Pat. No. RE 30,647 issued to Blose, a particular thread form or structure is disclosed for a tubular connection that provides an unusually strong joint while controlling the stress and strain in connected "pin" (male thread) and "box" (female thread) members to within acceptable levels. The pin member has at least one generally dovetail-shaped external thread whose width increases in one direction along the pin, while the box member has at least one matching generally dovetail-shaped internal thread whose width increases in the other direction. The mating set of helical threads provide a wedge-like engagement of opposing pin and box thread flanks that limit the extent of relative rotation between the pin and box members, and define a forcible make-up condition that completes the connection. In this thread structure, the angles of the flank shoulder, as well as the thread width, can be used to control the stress and strain preload conditions induced in the pin and box members for a given make-up torque. Thus, by tailoring the thread structure to a particular application or use, the tubular connection or joint is limited only by the properties of the materials selected.

As shown in FIG. 1, a prior art tubular connection 10 includes a pin member 11 and a box member 12. Box member 12 has a tapered, internal, generally dovetail-shaped thread structure 14 formed thereon which is adapted for engaging complementary tapered, external, generally dovetail-shaped thread structure 15 formed on pin member 11 to mechanically secure the box 12 and pin 11 members in a releasable manner.

Internal thread 14 on the box member 12 has stab flanks 18, load flanks 16, roots 20, and crests 24. The thread 14 increases in width progressively at a uniform rate in one direction over substantially the entire helical length of thread 14. External thread 15 of pin member 11 has stab flanks 19, load flanks 17, roots 21, and crests 25. The thread 15 increases in width progressively at a uniform rate in the other direction over substantially the entire helical length of thread 15. The oppositely increasing thread widths and the taper of threads 14 and 15, cause the complementary roots and crests of the respective threads 14 and 15 to move into engagement during make-up of the connection 10 in conjunction with the moving of complementary stab and load flanks into engagement upon make-up of the connection.

The pin member 11 or the box member 12 defines the longitudinal axis 13 of the made-up connection 10. The roots and crests of the box and pin members are flat and parallel to the longitudinal axis of the connection and have sufficient width to prevent any permanent deformation of the threads when the connection is made up.

An important part of any connection is a seal for keeping the conduit fluid pressure-tight at the connections. Typically connections will be designed to include metal-to-metal seals therein. Metal-to-metal seals have the advantage of not requiring gaskets or other additional sealing devices, which would typically have to be replaced periodically as the connections are coupled and uncoupled. Metal seals are created when contact pressure between two metal surfaces exceeds the fluid pressure to be sealed. Typically the contact pressures are created during make up of the connection.

More recently, oilfield tubular goods have been developed which can be radially expanded from their initial diameters after being installed for the intended application. See for example, R. D. Mack et al, *How in situ expansion affects casing and tubing properties*, World Oil, July 1999, Gulf Publishing Co., Houston, Tex., for a description of radially expanding oilfield tubular goods. Radially expandable tubular goods have particular application as casing in oil and gas producing wells. It has been difficult to seal radially expandable tubular connections using metal-to-metal seals known in the art.

SUMMARY OF THE INVENTION

The invention is a seal for a radially expansible conduit connection or coupling. The seal includes a first sealing surface disposed proximal to an end of a male portion of the connection, and includes a corresponding second sealing surface disposed proximal to an end of a female portion of the connection. The first and said second sealing surfaces are substantially opposite each other upon connection of the male and female portions. The seal includes a first clearance surface proximal to the first sealing surface on the make portion and a includes a second clearance surface proximal to the second sealing surface on the female portion. The first and second clearance surfaces are substantially opposite each other upon connection of the male and female portions. The first and second clearance surfaces, and the first and second sealing surfaces each have a diameter such that prior to radial expansion, the clearance surfaces do not contact each other. Upon radial expansion of the male portion and female portion after coupling together thereof, the clearance surfaces remain out of contact and the sealing surfaces contact each other so as to develop a contact pressure.

In one embodiment, the clearance between the sealing surfaces prior to radial expansion of the connection is about 30 to 50 percent of the amount of radial expansion.

In one embodiment, the clearance between the clearance surfaces prior to radial expansion is about 50 to 55 percent of the amount of radial expansion.

In another embodiment, the sealing surfaces are in interference fit prior to radial expansion of the connection. After the radial expansion, the contact pressure between the sealing surfaces is increased.

In one embodiment, the coupling is a threaded coupling including mating threads on the male and female portions of the coupling. The clearance surface on the male portion is proximal to the thread end, and the clearance surface on the female portion is proximal to the thread start in the threaded coupling embodiment.

DETAILED DESCRIPTION

Figure 1:
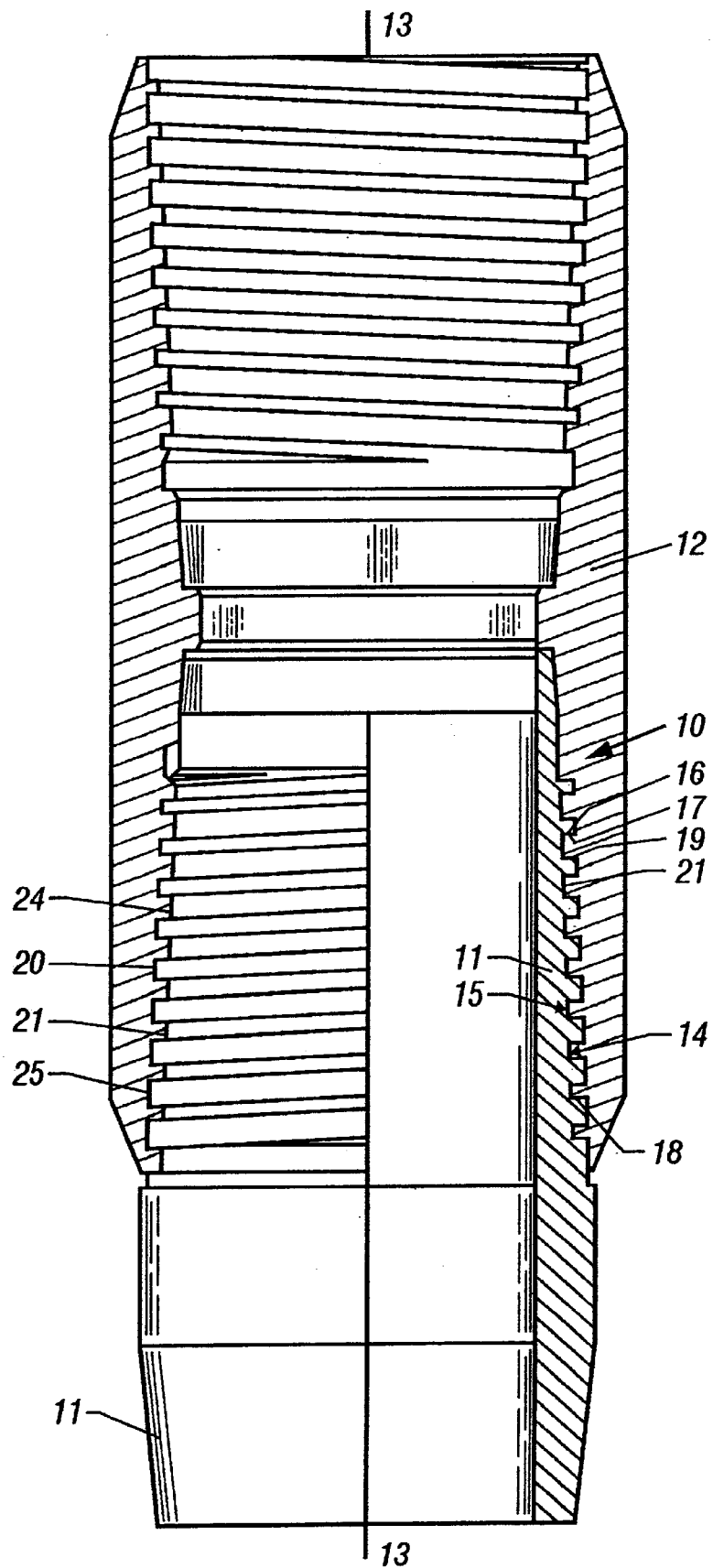
FIG. 1 shows a prior art tubular threaded connection.
Figure 2:
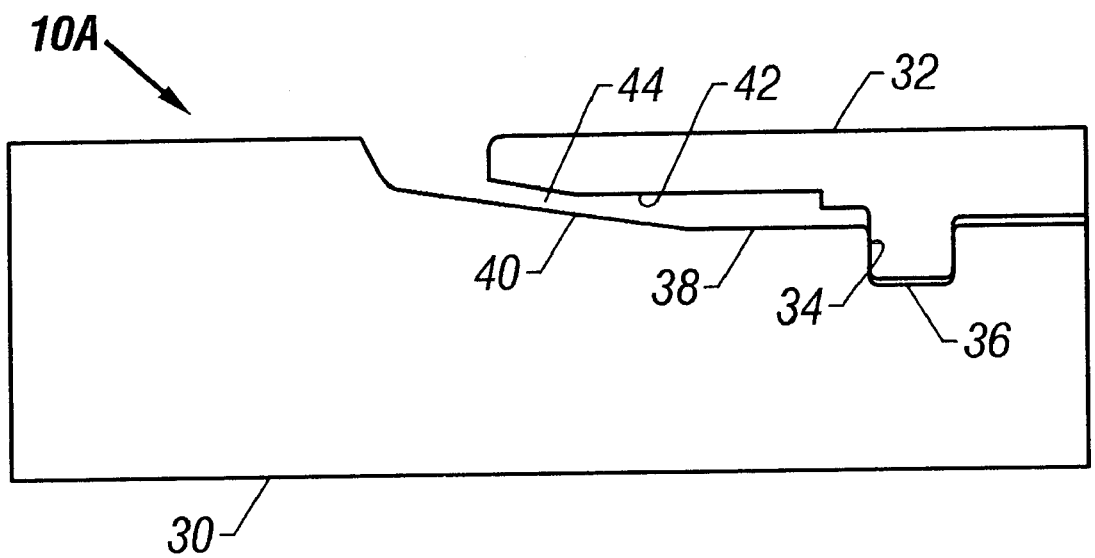
FIG. 2 shows one embodiment of the connection seal of the invention prior to radial expansion of the tubular joints and connection.

FIG. 2 shows one example of a tubular connection 10A as used on radially expandable tubular goods. The example shown in FIG. 2 is for a threaded coupling. FIG. 2 is a cross-section through only one side of the threaded tubular connection 10A, and the view shown in FIG. 2 should therefore be thought of as rotationally symmetric about the axis (not shown) of the tubular connection 10A. The tubular connection 10A is formed by joining a male-threaded "pin" member 30 to a female-threaded "box" member 32. The pin 30 and box 32 members have thereon corresponding threads 36 and 34, respectively, which when engaged provide axial coupling force to join tubular joints together. The threads 34, 36 can be any type known in the art for coupling together tubular goods, and may be a sealing type or a non-sealing type. The particular type of threads selected will depend, as is known in the art, on the intended use of the tubular goods being joined by the connection 10A. The type of threads is not intended to limit the invention. It should also be noted that the connection 10A can be formed wherein segments of conduit (not shown separately) include a pin at both ends and are connected by a short segment having box members at both ends, the short segment being known as a "collar". The connection 10A can also be formed wherein each segment of conduit includes therein a pin at one end and a box at the other. Either conduit connection will work with this invention.

In the example shown in FIG. 2, the box member 32 includes at its thread start end a clearance surface 42 and a sealing surface 44. The pin member 30 includes thereon at the end of the threads 36 a corresponding clearance surface 38 and sealing surface 40. The clearance surfaces 38 and 42 on the pin member 30 and box member 32, respectively, each may be parallel to the axis (not shown) of the connection 10A each so as to define a generally cylindrical surface, or they may be tapered. Similarly, the sealing surfaces 40 and 44 may be parallel, but the sealing surfaces 40, 44 are preferably tapered as shown in FIG. 2. Although the sealing surfaces 40, 44 as shown in FIG. 2 are parallel to each other as well as being tapered, it should be understood that the sealing surfaces 40, 44 need not be parallel to each other. In the invention, the clearance between the clearance surfaces 38, 42 is greater than the clearance between the sealing surfaces 40, 44 prior to radial expansion of the pin member 30 and box member 32. The additional clearance between the clearance surfaces 38, 42 results in a radially-inward deformation of the seal surface area (particularly seal surface 44) on the box 32 when the box 32 is radially expanded, which results in a high contact pressure between the sealing surfaces 40, 44. In the embodiment shown in FIG. 2, the clearance surface 42 on the box 32 has a larger internal diameter than does the seal surface 40 on the box 32 to provide the larger clearance between corresponding clearance surfaces 38, 42 than the corresponding seal surfaces 40, 44. It is also possible to provide larger clearance between the clearance surfaces 38, 42 by making the clearance surface 42 on the pin 30 with a smaller external diameter than the sealing surface 44 on the pin 30. Any other combination of internal diameters on the box surfaces 38, 40 and external diameters on the pin surfaces 42, 44 which provides larger clearance between corresponding clearance surfaces 38, 42 will also work with the invention.

Although FIG. 2 shows the sealing surfaces 40, 44 as having a small amount of clearance between them prior to radial expansion of the pin 30 and box 32, the sealing surfaces 40, 44 may also be in interference contact with each other. Where the sealing surfaces 40, 44 are in interference contact prior to radial expansion, after radial expansion the sealing surfaces 40, 44 will contact each other at a higher contact pressure than prior to expansion as long as the clearance surfaces 38, 42 remain out of contact after expansion.

The amount of clearance between the clearance surfaces 38, 42 prior to radial expansion will depend on, among other factors, the amount of radial expansion to be applied to the pin 30 and box 32, and the pre-expansion diameter of the pin 30 and box 32. Generally, large clearance where the amount of expansion is small, or small clearance where the amount of clearance is to be large are not highly desirable. A preferred amount of clearance between the sealing surfaces is about 30 to 50 percent of the amount of expansion to be applied, although other clearances will work with the invention, including interference fit, as previously explained. A preferred pre-expansion clearance for the clearance surfaces is about 50 to 55 percent of the amount of radial expansion, although other clearances will work with the invention. The important aspect is that the clearance surfaces 38, 42 retain some clearance therebetween after radial expansion of the box 32 and pin 30.

Figure 3:
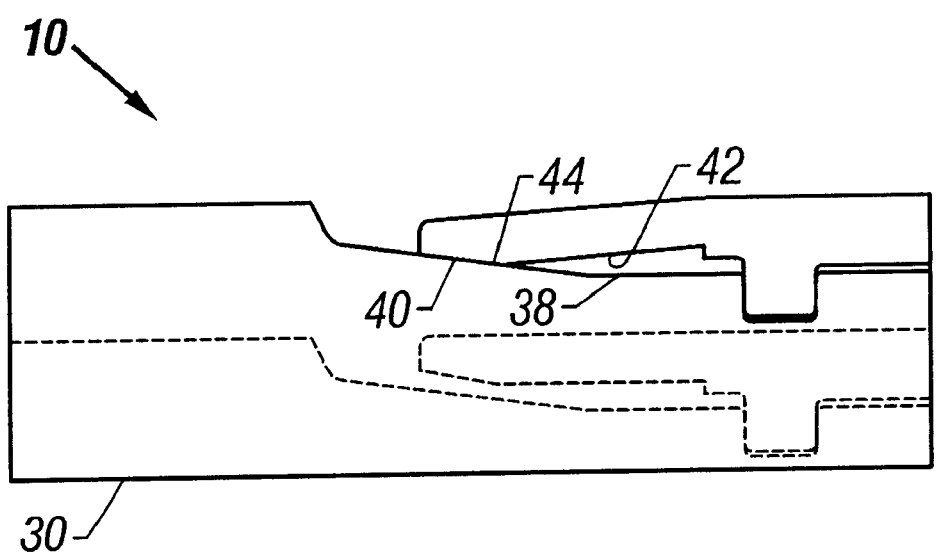
FIG. 3 shows one embodiment of the connection seal of the invention after radial expansion of the tubular joints and connection.

FIG. 3 shows the connection 10A after radial expansion of the pin 30 and box 32. As can be seen in FIG. 3, the sealing surfaces 40, 44 have been put into sealing contact with each other by reason of the radial expansion of the pin 30 and box 32. The clearance surfaces 38, 42 do not come into contact with each other as a result of the radial expansion of the pin 30 and box 32.

While the embodiment of the invention described herein includes a threaded coupling for joining segments of conduit, the invention does not require the use of threaded couplings. For example, J-slot connectors including locking pins on the pin end, with corresponding slots on the box end could provide axial coupling force to hold the pin and box together. Other types of couplings which do not use mating threads can also be devised by those skilled in the art.

Those skilled in the art will appreciate that the foregoing description is only meant to serve as an example of the embodiments of the invention which can be devised which do not depart from the spirit of the invention as disclosed. Accordingly, the invention shall be limited in scope only by the attached claims.

What is claimed is:

1. A seal for a radially expansible conduit connection, comprising:

a first sealing surface disposed proximal to an end of a male portion of said connection;

a second sealing surface disposed proximal to an end of a female portion of said connection, said first and said second sealing surfaces substantially opposite each other upon connection of said male and said female portions, said first and second sealing surfaces adapted to form a radial metal to metal seal;

a first clearance surface proximal to said first sealing surface on said male portion; and a second clearance surface proximal to said second sealing surface on said female portion, said first and second clearance surfaces and said first and second sealing surfaces each having a diameter such that prior to plastic radial expansion of said female and said male portions said clearance surfaces are proximal to each other and do not contact each other, and after said plastic radial expansion said clearance surfaces remain out of contact and said first and said second sealing surfaces contact each other so as to develop a contact pressure.

2. The seal as defined in claim 1 wherein at least one of said said first and said second sealing surfaces is tapered.

3. The seal as defined in claim 1 wherein said first and said second sealing surfaces are parallel to an axis of said connection.

4. The seal as defined in claim 1 wherein said first and second sealing surfaces do not contact each other prior to said radial expansion.

5. The seal as defined in claim 4 wherein said first and said second sealing surfaces prior to said radial expansion have a clearance therebetween of about 30 to 40 percent of an amount of said radial expansion.

6. The seal as defined in claim 1 wherein said first and said second sealing surfaces are in interference contact with each other prior to said radial expansion.

7. The seal as defined in claim 1 wherein a clearance between said clearance surfaces prior to said radial expansion is about 50 to 55 percent of an amount of said radial expansion.

8. The seal as defined in claim 1 wherein said second clearance surface has a larger internal diameter than said second sealing surface.

9. The seal as defined in claim 1 wherein said first clearance surface has a smaller external diameter than said first sealing surface.

10. The seal as defined in claim 1 wherein said conduit connection comprises a threaded connection, wherein said first clearance surface on said male portion is proximal to a thread end thereon, and said second clearance surface on said female portion is proximal to a thread start thereon.

11. A seal for a radially expansible threaded conduit connection, comprising:

a first sealing surface disposed proximal to an end of a male portion of said threaded connection;

a second sealing surface disposed proximal to an end of a female portion of said threaded connection, said first and said second sealing surfaces substantially opposite each other upon connection of said male and said female portions, said first and second sealing surfaces separate from a threaded portion of said threaded connection;

a first clearance surface proximal to said first sealing surface on said male portion; and a second clearance surface proximal to said second sealing surface on said female portion, said first and second sealing surfaces separate from a threaded portion of said threaded connection, said first and second clearance surfaces and said first and second sealing surfaces each having a diameter such that prior to plastic radial expansion of said female and said male portions said clearance surfaces are proximal to each other and do not contact each other, and after said plastic radial expansion said clearance surfaces remain out of contact and said first and said second sealing surfaces contact each other so as to develop a contact pressure.

12. The seal as defined in claim 11 wherein said first and said second sealing surfaces are tapered.

13. The seal as defined in claim 11 wherein said first and said second sealing surfaces are parallel to an axis of said threaded connection.

14. The seal as defined in claim 11 wherein said first and second sealing a surfaces do not contact each other prior to said radial expansion.

15. The seal as defined in claim 14 wherein said first and second sealing surfaces prior to said radial expansion have a clearance therebetween of about 30 to 40 percent of an amount of said radial expansion.

16. The seal as defined in claim 11 wherein said first and said second sealing surfaces are in interference contact with each other prior to said radial expansion.

17. The seal as defined in claim 11 wherein a clearance between said clearance surfaces prior to said radial expansion is about 50 to 55 percent of an amount of said radial expansion.

18. The seal as defined in claim 11 wherein said second clearance surface has a larger internal diameter than said second sealing surface.

19. The seal as defined in claim 11 wherein said first clearance surface has a smaller external diameter than said first sealing surface.

* * * * *

UNITED STATES PATENT AND TRADEMARK OFFICE
CERTIFICATE OF CORRECTION

PATENT NO. : 6,554,287 B1 Page 1 of 1
DATED : April 29, 2003
INVENTOR(S) : Robert S. Sivley, IV et al.

It is certified that error appears in the above-identified patent and that said Letters Patent is hereby corrected as shown below:

Column 2,
Line 51, replace "50" with -- 40 --

Column 4,
Line 21, replace "50" with -- 40 --

Signed and Sealed this

Second Day of September, 2003

JAMES E. ROGAN
*Director of the United States Patent and Trademark Office*